United States Patent
Kaplan

(10) Patent No.: US 10,466,434 B2
(45) Date of Patent: Nov. 5, 2019

(54) FIBER OPTIC SPLICE TRAY AND ENCLOSURE AND METHOD

(71) Applicant: Multilink Inc., Elyria, OH (US)

(72) Inventor: Steve E. Kaplan, Elyria, OH (US)

(73) Assignee: Multilink Inc., Elyria, OH (US)

( * ) Notice: Subject to any disclaimer, the term of this patent is extended or adjusted under 35 U.S.C. 154(b) by 0 days.

(21) Appl. No.: 15/824,479

(22) Filed: Nov. 28, 2017

(65) Prior Publication Data

US 2018/0164525 A1   Jun. 14, 2018

Related U.S. Application Data

(60) Provisional application No. 62/432,877, filed on Dec. 12, 2016.

(51) Int. Cl.
  *G02B 6/00* (2006.01)
  *G02B 6/44* (2006.01)

(52) U.S. Cl.
  CPC ......... *G02B 6/4454* (2013.01); *G02B 6/4446* (2013.01)

(58) Field of Classification Search
  CPC .. G02B 6/4452; G02B 6/4457; G02B 6/4454; G02B 6/4453; G02B 6/48
  USPC ................................................. 385/135–136
  See application file for complete search history.

(56) References Cited

U.S. PATENT DOCUMENTS

| | | | | |
|---|---|---|---|---|
| 4,489,830 A * | 12/1984 | Charlebois | ........... | G02B 6/3801 |
| | | | | 206/443 |
| 5,758,004 A * | 5/1998 | Alarcon | ............... | G02B 6/4442 |
| | | | | 174/93 |
| 6,760,530 B1 * | 7/2004 | Mandry | ............... | G02B 6/4471 |
| | | | | 385/135 |
| 2013/0243386 A1 * | 9/2013 | Pimentel | .............. | G02B 6/4441 |
| | | | | 385/135 |

* cited by examiner

*Primary Examiner* — Kaveh C Kianni
*Assistant Examiner* — Hung Q Lam
(74) *Attorney, Agent, or Firm* — Renner, Otto, Boisselle & Sklar, LLP

(57) ABSTRACT

A fiber splice enclosure for fusion splices or mechanical splices of optical fibers includes a splice tray, including a splice retainer having a main body and retainer space in the body, an open extent along a surface of the body to receive a splice connection, and a mounting bracket holds the splice retainer with the open extent facing a wall for cooperation with the wall to retain a splice connection in the retainer space. The mounting bracket may be resilient for bending away from the wall to expose a retainer space for insertion or withdrawal of a splice connection.

A method of positioning a fiber splice connection relative to a splice tray includes bending the mounting bracket to move the splice retainer from the wall to access retainer space in the splice retainer, and positioning a splice connection in or removing it from the retainer space.

20 Claims, 9 Drawing Sheets

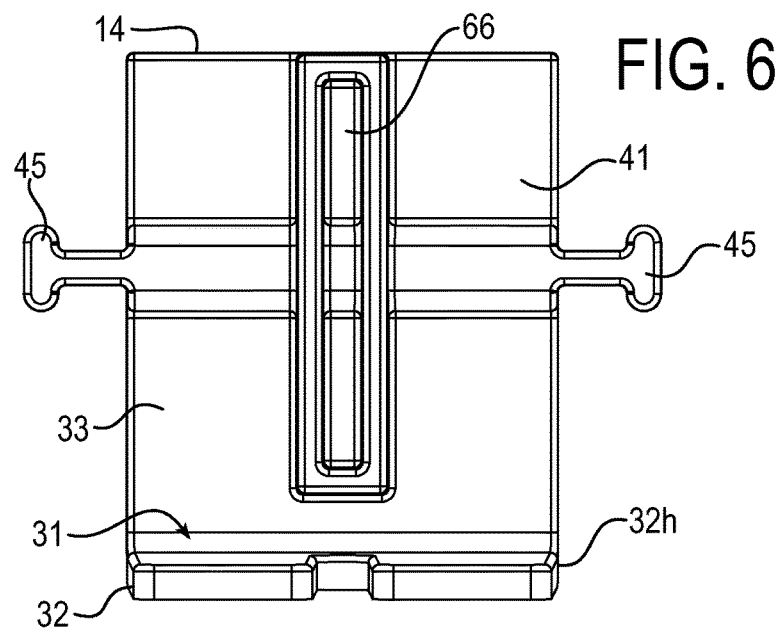
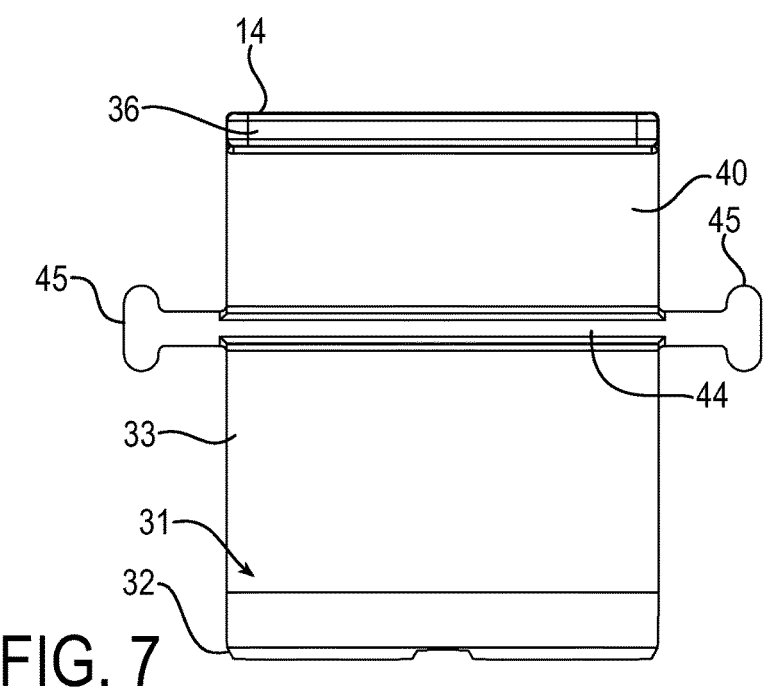

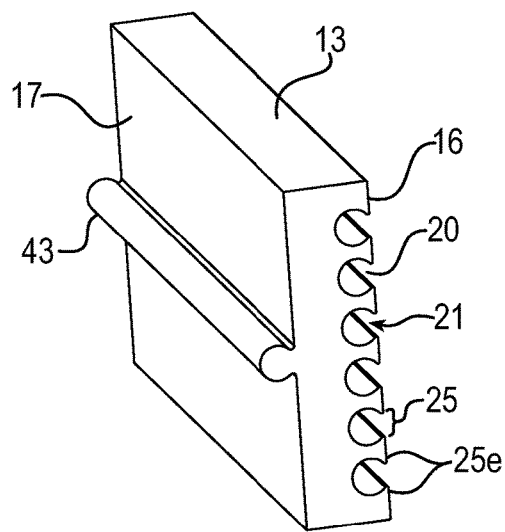
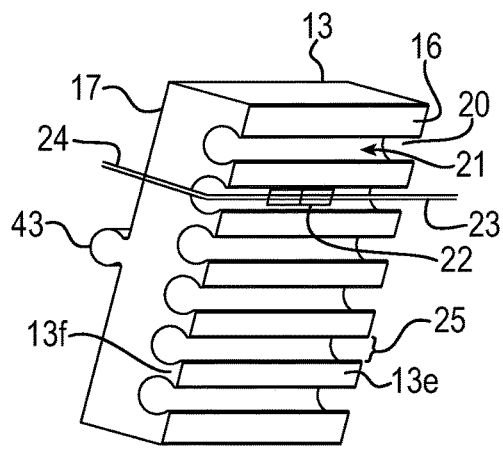
FIG. 8  FIG. 9
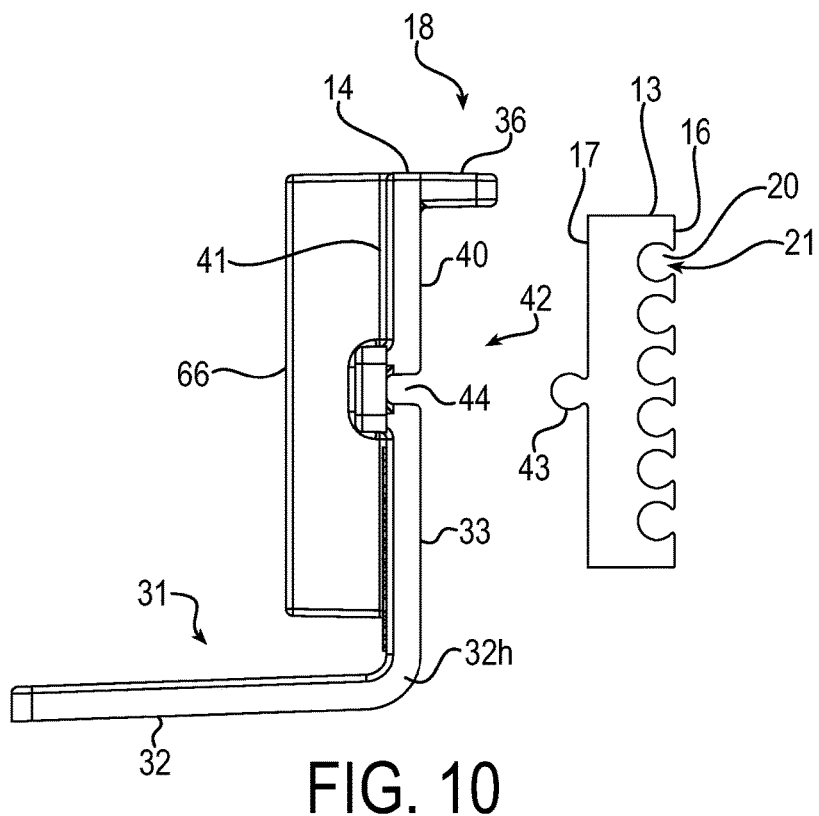
FIG. 10

FIBER OPTIC SPLICE TRAY AND ENCLOSURE AND METHOD

CROSS-REFERENCE TO RELATED APPLICATION AND PRIORITY CLAIM

This application claims the benefit and priority of U.S. provisional patent application Ser. No. 62/432,877, filed Dec. 12, 2016, the entire disclosure of which is hereby incorporated by reference.

FIELD OF INVENTION

The present application relates generally to apparatus and method for holding fiber optic cables and, more particularly, to apparatus and method for holding fusion splices of optical fibers.

BACKGROUND

Fiber splice enclosures have been used to provide protected space for fiber optic cables and fiber splices of fiber optic cables. An example of a typical fiber splice enclosure includes a box-like structure in which a mechanism for holding one or more fiber splices is mounted on the floor of the box-like structure. Such mechanism for holding one or more fiber splices sometimes is referred to as a splice tray that may be used to organize and to hold splices between optical conductors, e.g., optical fibers, or metallic conductors, e.g., wires, where two conductors or cables in which the conductors are contained are spliced, or joined together.

A fiber splice, also referred to as a fiber splice connection, is a joining of two optical fibers to provide for optical transmission of optical signals between the optical fibers. Exemplary fiber splices include fusion splice and splice using a mechanical device or mechanism. An optical fiber, for example, is a glass or plastic fiber that has capability to conduct or to guide light; for example, such guiding may be generally along the axis of the optical fiber. A fiber optic cable (also sometimes referred to as optical cable) is a cable containing one or more optical fibers. A fiber optic cable may include a covering or jacket in which one or more optical fibers are contained. The fiber optic cable may also contain one or more other parts such as, for example, a strength member, a dielectric member, or electrical insulating member, and so on. Portions of respective optical fibers may be exposed from respective coverings or jackets and may be joined in a fiber splice.

SUMMARY

Having the mechanism for holding fiber splices located on the floor of a fiber splice enclosure inefficiently uses space in the enclosure and also may make it cumbersome and difficult to position a fiber splice in and/or to retrieve a fiber splice from the mechanism that holds fiber splice(s). It would be desirable to improve efficiency of space utilization in a fiber splice enclosure. Such improved efficiency may provide more space to position connectors and/or other parts in the enclosure, space to store and/or to manage slack cable, e.g., for convenient availability for future use, and so on.

It also would be desirable to facilitate positioning of and retrieving fiber splices with respect to a mechanism that provides a holding function with respect to a fiber splice enclosure.

It also would be desirable to improve the efficiency and versatility of mounting, retaining and protecting fusion splices in a splice tray and in a splice enclosure.

It also would be desirable to improve fiber optic cable management and storage in a splice enclosure.

It also would be desirable to improve fiber optic slack cable management in a splice enclosure.

Briefly, one aspect of this disclosure relates to use of a wall in cooperation with a splice holder as a splice tray.

Another aspect relates to cooperation between a splice holder and a wall to provide a splice tray.

Another aspect relates to a method of placing and/or removing a fiber splice with respect to a splice holder that is cooperative with a wall of a fiber splice enclosure as a splice tray.

With regard to these and other aspects of this disclosure,
  optionally, the wall may be a wall of a fiber splice enclosure, and/or
  optionally, the wall may be a side wall of a fiber splice enclosure, and/or
  optionally, the wall may be a wall other than the floor of a fiber splice enclosure.

In an exemplary embodiment described herein the wall may be one of the side walls of a fiber splice enclosure rather than the floor wall (the floor wall sometimes is referred to as the back, rear or bottom wall) of the enclosure. Such placement with respect to and cooperation with a side wall allows area or geography of the floor wall and space thereabove availability for other storage, mounting and/or cable management functions, e.g., for slack cable and fiber optic cable storage, placement of connection devices and so on.

An aspect relates to a splice tray, including a splice retainer including a main body having a pair of opposite sides, and at least one retainer space in one of the sides, the retainer space having an open extent along at least a portion at a surface of the one side to receive a splice connection of at least two conductors, and a mounting bracket configured to hold the splice retainer relative to a wall with the open extent facing the wall for cooperation with the wall to retain a splice connection in the retainer space.

Optionally, the retainer space includes an elongate channel.

Optionally, the elongate channel is of a cross sectional size and configuration to receive therein a fusion splice of optical fiber conductors.

Optionally, the elongate channel has a depth to substantially fully submerge the fusion splice beneath the surface of the one side.

Optionally, the elongate channel having retaining edges along at least part of the length thereof adjacent the surface of the one side providing a narrow gap to receive a fusion splice in the elongate channel while resisting removal of the fusion splice from the channel.

Optionally, the splice retainer includes a plurality of additional elongate channels aligned parallel to and of the same configuration as said first-mentioned elongate channel.

Optionally, the one side of the splice retainer is of a shape substantially conforming to the shape of the faced wall with which the splice retainer is cooperative to provide a protected area in which a splice connection may be retained.

Optionally, the shape of the one side of the splice retainer is substantially flat.

Optionally, the splice retainer is of resilient flexible material.

Optionally, the splice retainer is of resilient rubber or polymer material.

Optionally, the mounting bracket includes an attachment structure configured for securing the mounting bracket in position with respect to the wall to hold the splice retainer relative to the wall.

Optionally, at least part of the mounting bracket is resiliently bendable for bending away from the wall to provide spacing of at least part of the splice retainer from the wall to permit access to at least one retainer space for placement, removal, or inspection of a splice connection.

Optionally, the mounting bracket includes a support portion configured to face and engage the other of the sides of the splice retainer.

Optionally, the splice tray further includes a connector configured to hold the splice retainer and the mounting bracket together.

Optionally, the connector includes a protruding portion of the splice retainer and a receiving opening in the mounting bracket configured to receive and to hold the protruding portion, whereby the splice retainer and mounting bracket are held together.

Optionally, the protruding portion comprises a raised ridge on the other side of the splice retainer extending in a linear direction generally parallel to the direction of the first mentioned retainer space, and the receiving opening extends in a linear direction to receive the raised ridge.

Optionally, the raised ridge has a curved cross section, is resiliently deformable and is configured to be compressed in the receiving opening for retention in the receiving opening.

Optionally the splice tray further includes at least one post extending from the mounting bracket configured for attachment thereto of a tie wrap or the like.

Another aspect relates to a media enclosure, including an interior having a rear wall and a plurality of side walls; and wherein the mounting bracket holds the splice retainer relative to at least one wall of the media enclosure to retain a splice connection in the retainer space.

Optionally, the media enclosure further includes a fastening mechanism configured to attach the mounting bracket to the media enclosure in position to hold the splice retainer facing at least one wall of the media enclosure, whereby such one wall covers at least part of the splice retainer to retain a splice connection in the retainer space.

Optionally, there are a number of splice trays distributed at respective locations in the media enclosure.

Optionally, the media enclosure includes a storage space for slack cable, and at least one cable management clip is mounted in the media enclosure to guide slack cable in stored position in the storage space.

Optionally, the at least one cable management clip comprises a plurality of cable management clips distributed in the media enclosure.

Optionally, the cable management clip is generally V-shape to provide a positioning guide for slack cable between legs of the cable management clip.

Optionally, one leg of the cable management clip is cooperative with a wall of the media enclosure to guide positioning of fiber optic cable in the media enclosure between the one leg and a side wall of the media enclosure.

Optionally, the one leg extends angularly from the rear wall spaced from a side wall of the media enclosure toward an edge of the side wall remote from the rear wall to provide a space bounded generally between at least part of the one leg and at least part of the side wall for guiding a fiber optic cable in the space, and wherein the one leg is resiliently bendable away from the side wall of the media enclosure to permit placing and removing of a fiber optic cable in the space.

Optionally, the media enclosure further includes a cable management clip mounted to the media enclosure, the cable management clip having a leg cooperative with a wall of the media enclosure to guide positioning of fiber optic cable in the media enclosure between the one leg and a side wall of the media enclosure.

Optionally, the leg extends angularly from the rear wall spaced from a side wall of the media enclosure toward an edge of the side wall remote from the rear wall to provide a space bounded generally between at least part of the leg and at least part of the side wall for guiding a fiber optic cable in the space, and wherein the one leg is resiliently bendable away from the side wall of the media enclosure to permit placing and removing of a fiber optic cable in the space.

Another aspect relates to a media enclosure including an interior having a rear wall and a plurality of side walls; and a mounting bracket attached with respect to at least one of the rear wall or a side wall, the mounting bracket having a surface facing a corresponding portion of a side wall defining a space between the surface and corresponding portion of a side wall, the bottom end of the space bounded by the rear wall of the media enclosure, the mounting bracket having a top edge portion angularly arranged with respect to the surface covering one end of the space, whereby the space is substantially bounded by the surface, corresponding portion of a side wall, top edge portion, and rear wall of the media enclosure, wherein the space is open at respective sides of the space allowing a fiber optic cable to enter and/or to exit the space, whereby the mounting bracket holds the fiber optic cable with respect to the side wall of the media enclosure.

Optionally, the rear wall and side walls are a box-like structure.

Optionally, the media enclosure further includes a cover for the box-like structure covering the interior of the box-like structure.

Optionally, the media enclosure includes an entry opening leading into the media enclosure from outside the media enclosure for passage of fiber optic cable into the media enclosure.

Another aspect relates to a method of positioning a fiber splice connection with respect to a splice tray that includes a resilient mounting bracket and a splice retainer that is coupled to the mounting bracket that has a resilient characteristic and a wall with respect to which the splice retainer is positioned by the mounting bracket, comprising temporarily bending the mounting bracket to move the splice retainer away from the wall to provide access to a retainer space in the splice retainer, and positioning a splice connection to install it in the retainer space or to remove it from the retainer space.

Optionally, the wall is part of a fiber splice enclosure, and said positioning a splice connection comprises positioning a splice connection in or removing a splice connection from the fiber splice enclosure.

Optionally, the fiber splice enclosure is a media enclosure.

These and other aspects and features of this disclosure will be clear with reference to the following description and drawings, in which embodiments are disclosed to indicate some ways for implementing the principles of the present disclosure. However, it will be appreciated that the scope of the present disclosure is not limited thereto. On the contrary, the present disclosure includes any change, modification and equivalent falling within the scope, spirit and connotation of the accompanying claims.

The term "include/comprise" herein refers to the existence of feature, element, step, or component, not excluding the existence or addition of one or more other features, elements, steps, components or combinations thereof.

Various aspects of the present disclosure can be better understood with reference to the following drawings. The components in the drawings are not necessarily drafted to scale, and the emphasis is laid upon clearly illustrating the principles of the present disclosure. For the convenience of illustrating and describing some parts of the present disclosure, corresponding parts in the drawings may be enlarged in size, e.g., enlarged to be larger than the case in an exemplary device actually made according to the present disclosure, relative to other parts. Components and features depicted in one drawing or embodiment of the present disclosure may be combined with components and features depicted in one or more additional drawings or embodiments. Moreover, in the drawings, the same reference signs designate corresponding parts throughout the drawings and may be used to designate the same or similar parts in at least one embodiment.

BRIEF DESCRIPTION OF THE DRAWINGS

The included drawings are used for providing further understandings of the present disclosure, and they constitute a part of the Specification. Those drawings illustrate the preferred embodiments of the present disclosure and elaborate the principles of the present disclosure together with the descriptions.

In the annexed drawings:

FIGS. 6 and 7 are, respectively, front and rear views, generally in elevation, of the mounting bracket of FIGS. 4 and 5;

FIG. 8 is a perspective rear view of a splice holder for a splice tray;

FIG. 9 is a perspective front view of the splice holder of FIG. 8;

FIG. 10 is an exploded side elevation view of the mounting bracket and splice holder of the splice tray of FIGS. 1-3;

DESCRIPTION

Figure 1:
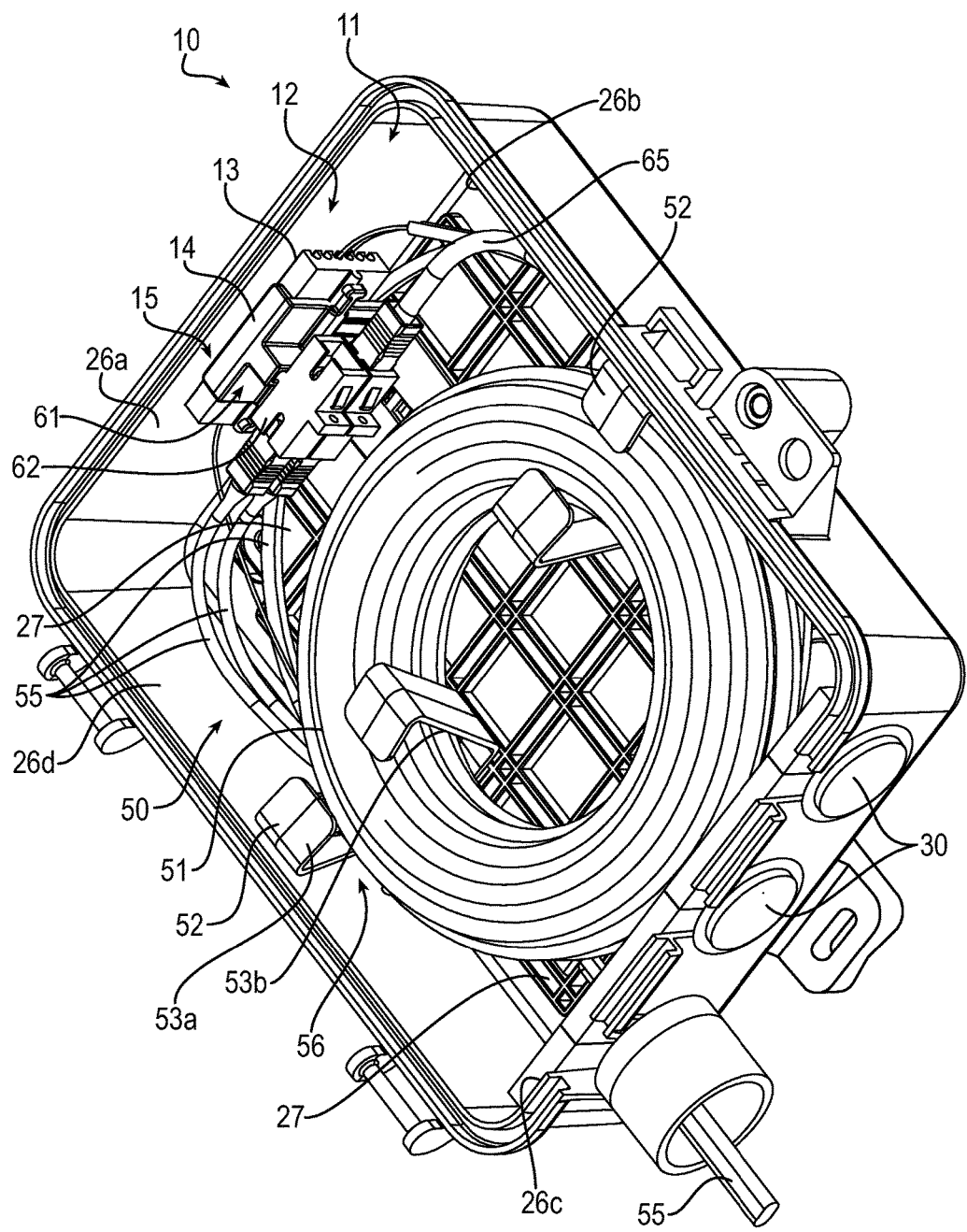
FIG. 1 is a perspective illustration of a fiber splice enclosure including a splice tray and also a number of connectors and stored slack cable in the fiber splice enclosure.
Figure 2:
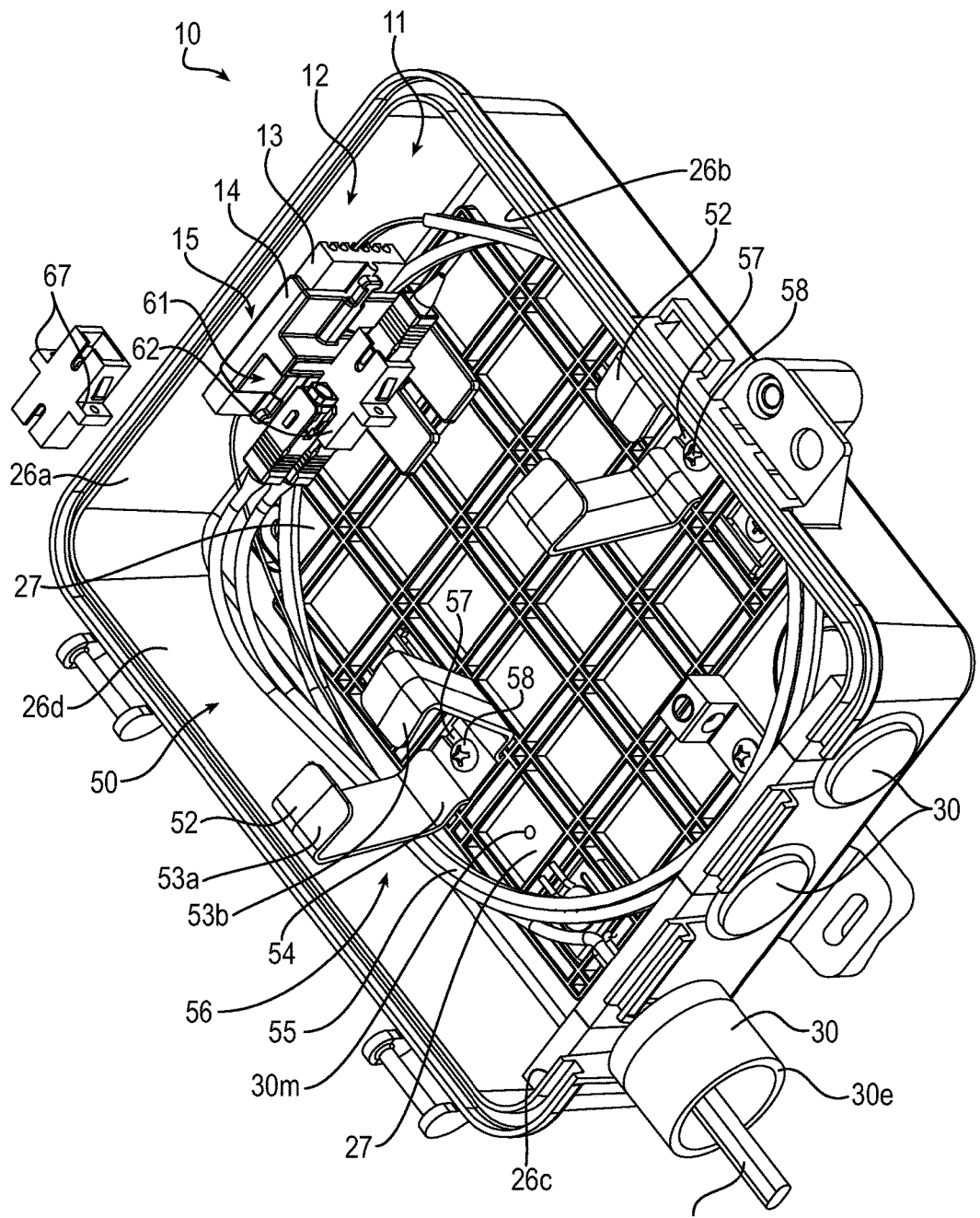
FIG. 2 is an illustration similar to FIG. 1 but with the slack cable omitted and one of several connectors omitted to permit seeing more clearly the splice tray and the interior of the fiber splice enclosure.

Referring, now, to the drawings, wherein like reference numerals refer to like parts in the several figures and wherein the illustrations are somewhat schematic and not necessarily to scale, but are presented to provide together with the description herein an understanding of various features of this disclosure, and initially to FIGS. 1 and 2, a fiber splice enclosure 10 is illustrated. The fiber splice enclosure 10 is in the form of a telecommunications mounting case (sometimes referred to as case, media enclosure and so on), but it will be appreciated that the enclosure 10 may be for various other purposes while providing a relatively protected space in which splices of conductors, whether of the optical type or electrical type, may be contained. The disclosure will focus on optical environments and parts, e.g., including fiber optic cables, optical fibers, splices thereof and associated parts, but it will be appreciated that the features of the disclosure may similarly apply to electrical environments and parts, e.g., including electrical cables, electrical conductors, splices thereof and associated parts.

In FIGS. 1 and 2 the fiber splice enclosure 10, which sometimes is referred to as a mounting case or as a case, has in the interior 11 thereof a splice tray 12.

Figure 3:
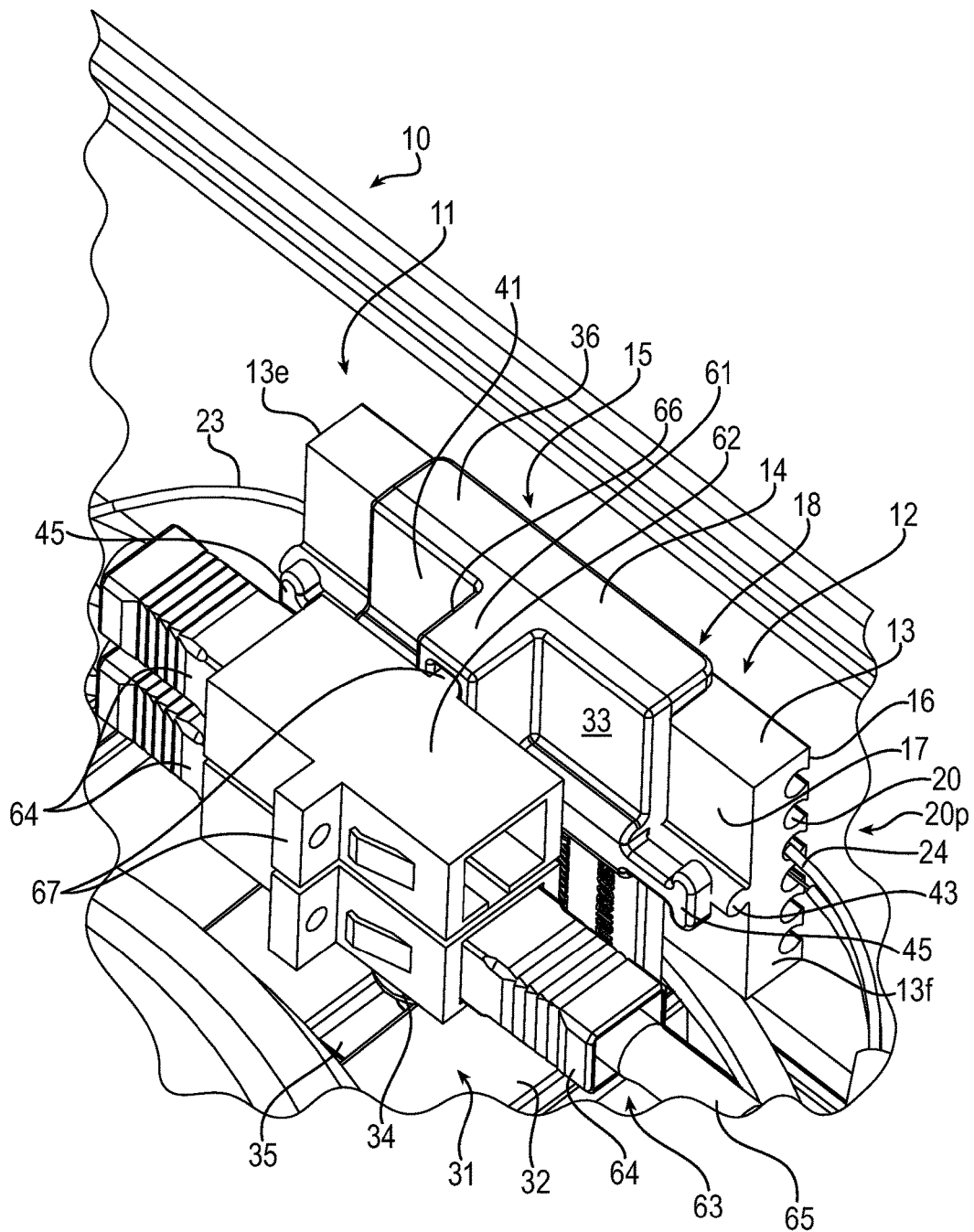
FIG. 3 is a fragmentary perspective illustration showing in enlarged format the splice tray of FIGS. 1 and 2.
Figure 4:
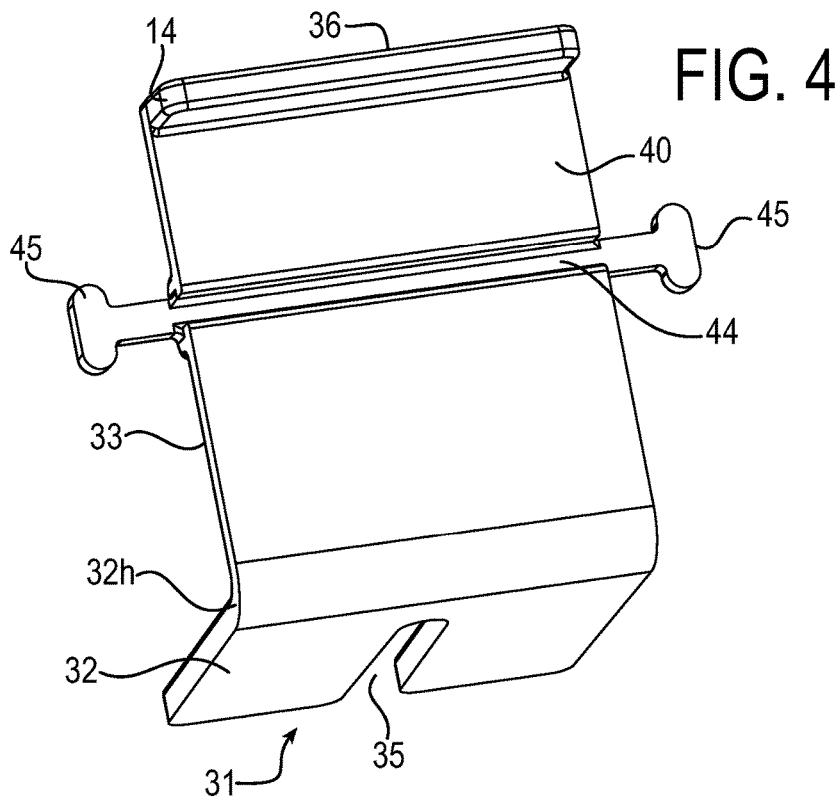
FIG. 4 is a perspective front view of a mounting bracket for a splice tray.
Figure 5:
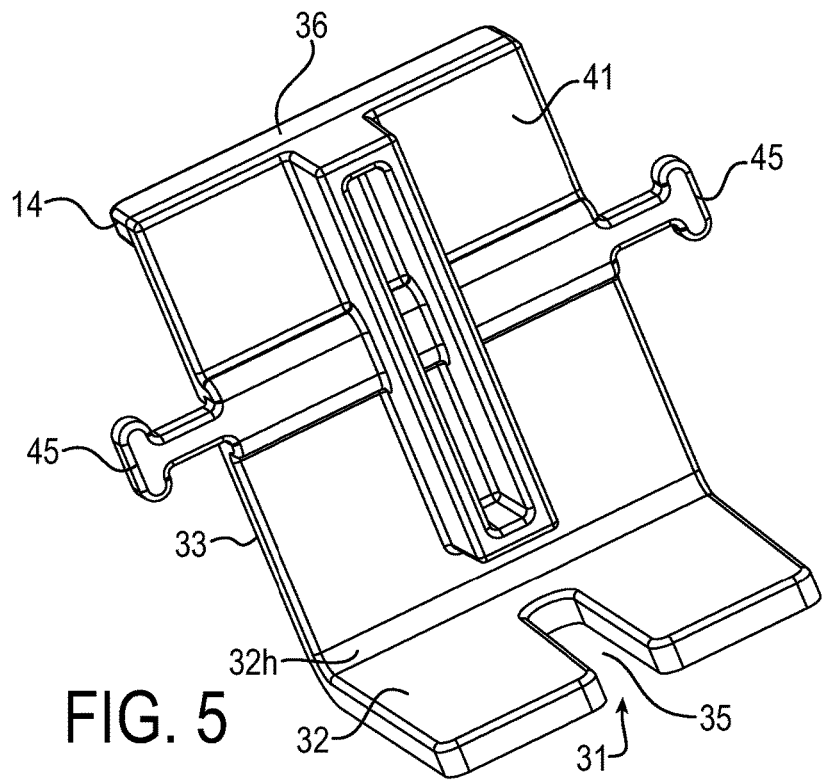
FIG. 5 is a perspective rear view of the mounting bracket of FIG. 4.

Referring to FIG. 3 as well as the other figures, the splice tray 12 includes a splice retainer 13, a mounting bracket 14 configured to hold the splice retainer 13, and a wall, for example, wall portion 15. The mounting bracket 14 holds the splice retainer 13 relative to the wall, e.g., wall portion 15, of the enclosure 10. The splice retainer 13 has a pair of opposite sides or faces 16, 17—for convenience the face 16 is referred to as front side and the side 17 as rear or back side. One or more retainer spaces 20 are in one of the sides 16 or 17 (shown in front side 16 of the splice retainer 13).

The splice retainer 13 and mounting bracket 14 cooperate as a splice holder 18 to hold a splice relative to a wall, e.g., wall portion 15. The splice tray 12 is a combination of the splice retainer 13, mounting bracket 14 and wall portion 15; these being cooperative to retain a splice connection relatively protected in a retainer space 20, as is described further herein.

Although the splice retainer 13 and mounting bracket 14 are shown as part of a single splice tray 12 in the enclosure 10, it will be appreciated that there may be more than one splice tray in the enclosure 10.

As is seen in FIGS. 1-3 and 8-10, in the splice retainer 13 the retainer space 20 has an open extent 21 along at least a portion of a surface of the side in which it is located, e.g., front side 16, and thereby is accessible to receive a splice connection 22 of at least two conductors 23, 24, which is representatively schematically shown in FIG. 9. Moreover, as is described further below, the mounting bracket 14 may be somewhat flexible or resilient to allow it to be bent away from the wall portion permitting access to one or more of the retainer spaces 20 for placement or removal of a splice 22 and/or conductors 23, 24 in the splice tray 12; and then the mounting bracket may resiliently spring back substantially into the same position prior to the bending. Also, in an embodiment illustrated in FIG. 14 such bending of the mounting bracket 14 permits access to the space between the mounting bracket and wall portion 15, for example, to place or to remove a splice 22, conductors 23, 24, or other conductors and the like.

Referring also to FIGS. 4-7, the mounting bracket 14 is configured to hold the splice retainer 13 relative to the wall portion 15 with the open extent 21 facing the wall portion for cooperation by and between the splice retainer and the wall portion to retain a splice connection 22 in the retainer space 20. As is seen in several of the drawings, the open extent 21 of the retainer space 20 is elongate along the splice retainer 13 from one edge 13e to the other edge 13f of the splice retainer. The open extent 21 of the retainer space 20 is an open channel or the like, e.g., trough-like space extending below the surface of the side 16 from edge to edge 13e, 13f of the splice retainer 13. A gap or elongate opening 25 at the surface of the face or side 16 provides an entrance into the interior of the retainer space 20. The walls of the retainer space 20, the mounting bracket 14 and/or the wall portion 15, provide protection of the splice connection 22 from damage by external forces.

The splice retainer 13 may be somewhat resilient or resiliently compressible and/or resiliently flexible to allow it to be slightly compressed and/or flexed, bent, etc. to conform to the shape of the mounting bracket 14 and the wall portion 15 as the mounting bracket urges the splice retainer in engagement with the wall portion or at least positions the splice retainer with respect to, e.g., near or adjacent, such wall. This characteristic of the splice retainer 13 may help in providing cooperation among the splice retainer, mounting bracket, and wall portion to help assure that a splice is retained in a somewhat protected space 20p provided by the retainer space 20 and the wall portion 15 with which the splice retainer may be engaged. The protected space helps to prevent damage to the splice 22, e.g., disconnection of conductors, deformation, or distortion of conductors or of the splice, and so on. Moreover, the mounting bracket 14 may be resilient to allow it to be temporarily bent away from the wall portion 15 to allow a splice to be inserted or removed from a retainer space 20.

Figure 13:
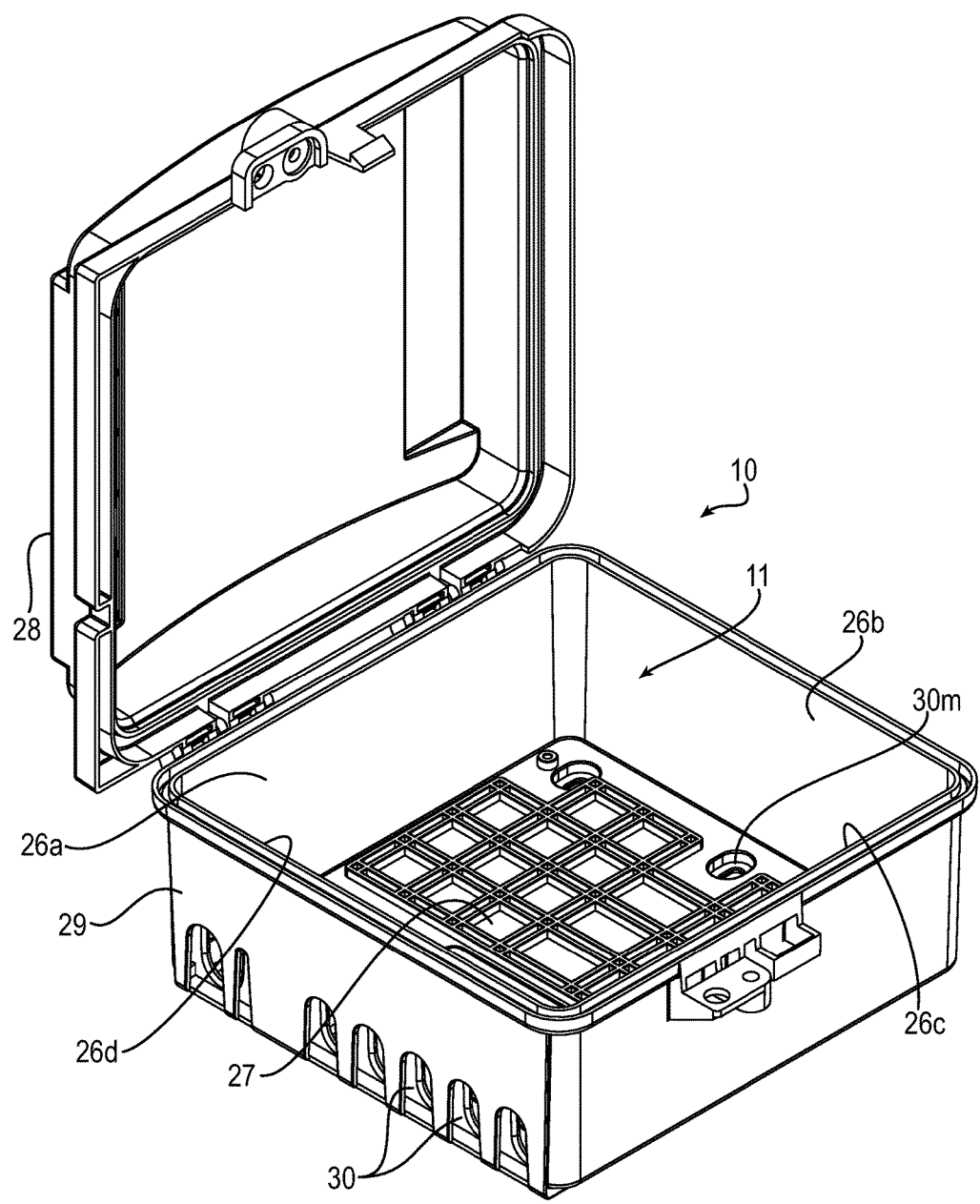
FIG. 13 is a schematic perspective view of a fiber splice enclosure in which a splice tray as disclosed herein may be used.

As is illustrated in FIGS. 1, 2 and 13, the fiber splice enclosure 10 is rectangular and includes four side walls 26a, 26b, 26c and 26d (collectively walls 26) and a bottom wall 27, which also may be referred to as floor, rear or back wall. The enclosure 10 may be of other shape, e.g., triangular, hexagonal or some other shape and, accordingly, include fewer or more side walls. The wall portion 15 referred to above may be one of the walls 26 or part of one of the walls 26. A cover or closure 28 (FIG. 13) may be positioned with respect to the side walls 26 to cooperate with the side walls and the bottom wall 27 to generally enclose the interior 11 of the enclosure 10 providing a somewhat protected space or volume for splices, splice trays 12, connectors, slack cable and so on, as is described further herein. In FIGS. 1 and 2 the cover 28 is omitted; in FIG. 13 the cover is shown in open position attached to the open box-like base portion 29 of the enclosure 10, e.g., the base portion including the side walls 26 and bottom wall 27. Openings and/or knockouts for openings generally shown at 30 may be provided in one or more walls for entry into and/or exit from the media enclosure 10. As shown in FIGS. 1 and 2, one of the openings 30 has a fitting 30e attached as an entrance to guide a fiber optic cable 55 into the interior 11 of the media enclosure. Also, mounting openings 30m (FIGS. 2 and 13) or the like may be provided for the enclosure 10, for example, in one or more of the side walls 26 and/or the bottom wall 27 to facilitate mounting the fiber splice enclosure 10 with respect to another structure, such as, for example, the wall of a building, a pole, and so on.

As is seen in the enlargement of FIG. 3 and also in FIGS. 1 and 2, the mounting bracket 14 of the splice tray 12 is positioned in the enclosure 10 so as to hold the splice retainer 13 relative to a wall portion 15 of the enclosure so that the wall portion 15 and the face or side 16 of the splice retainer cooperate. For example, the wall portion 15 covers the open extent 21 of the splice retainer 13 to block the retainer space 20 so that the splice connection 22 and the portions of the conductors 23, 24 that are in the retainer space will not fall out from the retainer space. Also, in an embodiment the mounting bracket holds the splice retainer 13 such that the face or side 16 of the splice retainer is very close or engaged with the wall portion 15 so that the open extent 21 is covered by the wall portion and the splice connection is blocked from unintentionally falling out. It will be appreciated that although one retainer space 20 is described just above, the splice retainer 13 may have several retainer spaces 20, as is illustrated, that also may be covered by the wall portion 15, e.g., as was just described.

In FIGS. 1-7 and 10 the mounting bracket 14 is shown. The mounting bracket 14 is configured to hold the splice retainer 13 relative to a wall, e.g., wall portion 15, with the open extent 21 facing the wall for cooperation with the wall to retain and to protect a splice connection in the retainer space 20. In the illustrated embodiment the wall with which cooperation is provided may be the wall portion 15 mentioned above or may be another wall with respect to which the mounting bracket 14 and splice retainer 13 are positioned. For example, the wall may be a wall of a splice enclosure, media enclosure, telecommunications mounting case, junction box, and so on. The wall may be a wall not associated with an enclosure, e.g., a building wall or room wall, a laboratory bench wall, and so on.

The mounting bracket 14 includes an attachment structure 31 configured for securing the mounting bracket in position with respect to the wall portion 15 or other wall or surface with respect to which the splice retainer is to be positioned as described herein. The mounting bracket 14 includes a base 32 and a backing wall 33. The mounting bracket may be attached to a structural part of the splice enclosure 10. For example, the mounting bracket may be attached by one or more screws or other fasteners 34 to the bottom wall or floor 27 or to some other wall or part of the splice enclosure. A slot, groove, hole, etc. 35 may be in the base 32 for positioning of a fastener 34 for such attachment, e.g., as can be seen in FIGS. 1-3. The attachment structure 31 thus includes the base 32 and/or other part(s) for securing the mounting bracket to the splice enclosure or to another device, surface, etc. for use as described herein. The fastener 34 and slot 35 are one example of a fastening mechanism or attachment structure configured to attach the mounting bracket 14 to the enclosure 10 in position to hold the splice retainer 13 facing at least one wall of the enclosure such that the one wall covers at least part of the spice retainer to retain a splice connection 22 in the retainer space 20.

A top wall, ledge, or edge 36 of the mounting bracket 14 extends out from the backing wall 33. The top wall 36 may be of a size to block the splice retainer 13 from rising above the top wall. The top wall 36 also may be of a size to assure desired spacing and positioning of the mounting bracket relative to a side wall 26a-26d of the media enclosure 10 allowing the splice retainer to be removed and/or replaced relative to the its positioning with respect to the mounting bracket.

Referring additionally to FIGS. 8-10, the splice retainer 13 is shown. If desired, the cross-sectional shape of the retainer space 20 in the splice retainer 13 may be such that the entrance walls or edges 25e of the gap 25 leading into the depth of the retainer space 20 at which a splice connection 22 and/or conductors are urged into the retainer space is narrower than the space deeper into the retainer space; and the splice retainer 13 may have a resilient characteristic. Therefore, a splice connection 22 and/or conductors that are connected at a splice may be urged into the retainer space 20, while urging the entrance walls 25e at the gap 25 apart, and then further urged into the depth of the retainer space 20. The splice retainer 13 may be of resilient flexible material; for example, it may be of resilient rubber or polymer material. If the splice retainer has a resilient characteristic, the entrance walls 25e tend to spring back toward each other after a splice connection 22 (and possibly adjacent conductors) has been urged into the retainer space to tend to narrow the gap 25 to help retain the splice and/or conductors in the retainer space 20.

One side or face, e.g., the front face 16, of the splice retainer 13 may be of a shape that is substantially conforming or substantially conforms to the shape of the faced wall portion, e.g., wall portion 15, with which the splice retainer is cooperative to provide a protected area 20p (FIG. 1) in which a splice connection 22 may be retained. In an embodiment the splice retainer 13 may be of a shape or form factor for convenient and effective cooperation with the mounting bracket 14 and with the wall portion 15. For example, such cooperation may be such that the splice retainer 13 engages the mounting bracket 14 and the wall portion 15 so that the splice retainer is held by the mounting bracket 14 in engagement with the wall portion 15 to block or to cover the retainer space 20 tending to prevent a splice 22 from falling out from the retainer space. In an embodiment as illustrated, the front and back sides or faces 16, 17 of the splice retainer 13 are generally flat and the parts of the mounting bracket 14 and wall portion 15 between which the splice retainer is positioned are generally flat but may be of other shape, as may be desired, to provide adequate cooperation, e.g., as described herein.

The mounting bracket 14 backing wall 33 includes a front face 40 and a back face 41. The front face 40 of the backing wall and the back face 17 of the splice retainer 13 are configured to cooperate such that the mounting bracket may engage the splice retainer over a large area or interface. For example, both the front face 40 and back face 17 may be flat or of other generally confirming shape so that the backing wall 33 may effectively urge the splice retainer toward and possibly also to engage the wall portion 15. Having the front face 16 of the splice retainer 13 engaged with wall portion 15 may close off the gap 25 or entrance to the retainer space 20 and may provide further protection for a splice connection 22 and/or conductors in the protected space 20p in the splice retainer. The configuration of the of the faces 40 and 17 may be other than flat, as may be desired.

A connector 42 holds together the splice retainer 13 and the mounting bracket 14. In an embodiment the connector 42 includes a protruding portion, such as ridge 43, on the back face 17 of the splice retainer 13 and a receiving opening, e.g., a retaining groove or slot 44, on the front face 40 of the mounting bracket to receive the protruding portion. The protruding ridge 43 may be inserted into the slot 44. The ridge may be raised from the generally planar back face 17 of the splice retainer 13. The ridge 43 may be of somewhat resilient material, e.g., rubber or polymer, and may be of a thicker cross-sectional dimension perpendicular to its length than the width of the slot 44 perpendicular to its length; and, therefore, the ridge may be compressed upon insertion into the slot to frictionally be received and retained in the slot, thereby holding together the splice retainer and mounting bracket. The cross-sectional shape of the raised ridge may be curved and, as mentioned above, may be resiliently deformable and configured to be compressed in the receiving opening of the retaining groove or slot 44 for retention in the receiving opening, e.g., by frictional relationship with the walls of the groove or slot 44. The ridge 43 and slot 44 may be generally linear or elongate and may cooperate to distribute force along their length while holding together the splice retainer and mounting bracket and also tending to avoid twisting or rotating of the splice retainer relative to the mounting bracket, thus avoiding stressing a splice connection or conductors by some unintended force applied to the splice retainer 13. It will be appreciated that other connector mechanisms also or alternatively may be used to connect the splice retainer 13 and mounting bracket 14.

In an embodiment, at least part of the mounting bracket 14 is resiliently bendable for bending away from the wall portion 15 (or other wall) to provide spacing of at least part of the splice retainer 13 from the wall to permit access to at least one retainer space 20 for placement, removal, or inspection of a splice connection 22, as was mentioned above. For example, backing wall 33 may be bent relative to the base 32. For example, the juncture 32h of the backing wall 33 and base 32 may be a living hinge that is quite stiff allowing the mounting bracket ordinarily to maintain its shape or form factor, on the one hand, but, on the other hand, with sufficient force applied to the backing wall 33 allows the backing wall to pivot or to bend at the juncture 32h. Therefore, with the splice tray in use such that the splice retainer 13 is held by the mounting bracket engaged with or close to the wall portion 15, for example, if desired the backing wall may be bent away from the wall portion 15, e.g., by a person applying a bending force or torque to the backing wall 33, allows the splice retainer 13 to move away from the wall portion 15 and, therefore, permits access to a retainer space 20 to insert or place a splice connection 22 and/or conductors into the retainer space or to remove the splice connection and/or conductors from the retainer space.

Such inserting/placing or removing of a splice connection may be done without having to remove the mounting bracket 14 and/or the splice retainer 13 from the media enclosure. After such inserting/placing or removing has been carried out, the mounting bracket may be released and permitted to spring back or resiliently move back to position, e.g., as shown in FIGS. 1 and 2, for example, providing the holding and protection for splice connection 22, etc., as described herein. If desired, the above bending features may be achieved, for example, by a living hinge function mentioned above, by having the backing wall 33 and/or the base 32 being somewhat flexible, or by having some other effective mechanism.

One or more posts 45 may extend from the mounting bracket 14. In an embodiment the posts 45 may be tie wrap or wire wrap posts that extend from the edges of the of the backing wall 43. One or more turns of optical cable or fiber may be held by tie wraps, which may be wrapped about a post 45 to facilitate retaining the cable or fiber in position relative to the mounting bracket and possibly providing a strain relief function so that stress or pulling on one part of the cable or fiber would tend not to be transmitted to a different part of the cable or fiber or from a splice connection 22. The posts 45 also may be a location on which a fiber optic cable or an optical fiber may be wrapped or mounted to hold in position one or more cables or fibers relative to the mounting bracket and, thus, for example, in position in the splice enclosure 10.

As was mentioned above, the fiber splice enclosure 10, which is illustrated as an exemplary media enclosure in the drawings, has an interior 11 bounded by the side or perimeter walls 26a-26d and the bottom wall 27. As for the splice tray 12, the mounting bracket 14 holds the splice retainer 13 relative to at least one of the walls of the media enclosure 10, e.g., wall portion 15, to retain a splice connection in the retainer space of the splice tray. The mounting bracket 14 is attached to the media enclosure in position to hold the splice retainer 13 facing at least one of the walls, e.g., wall portion 15, of the media enclosure 10, whereby that one wall or wall portion covers at least part of the splice retainer to retain a splice connection 22 in the retainer space 20.

In FIGS. 1 and 2, for example, one splice tray 12 is shown in the fiber splice enclosure 10. However, it will be appreciated that there may be a number of splice trays 12 distributed at respective locations in the media enclosure 10. For example, more than one splice tray 12 may be mounted in the fiber splice enclosure in a manner similar to that shown in FIGS. 1 and 2. The splice trays may be located or placed such that more than one is positioned relative to one of the side walls 26a-26d of the fiber splice enclosure, and/or they may be positioned such that one or more splice trays 12 is positioned relative to one, two or more side walls 26a-26d.

As is seen in FIGS. 1 and 2, the media enclosure 10 includes in the interior 11 storage space 50 that may be used for various purposes. For example, the storage space 50 may provide space for storing slack cable 51 (also referred to as slack cable conductor). The slack cable would be conveniently available for various connection functions, for example.

In FIG. 2 to show the interior 11 of the media enclosure 10, the slack cable has been omitted. One or more cable management clips 52 may be mounted in the media enclosure 10 to guide slack cable 51 in stored position in the storage space 50, e.g., distributed at respective locations in the media enclosure, as is shown in FIGS. 1 and 2.

Figure 11:
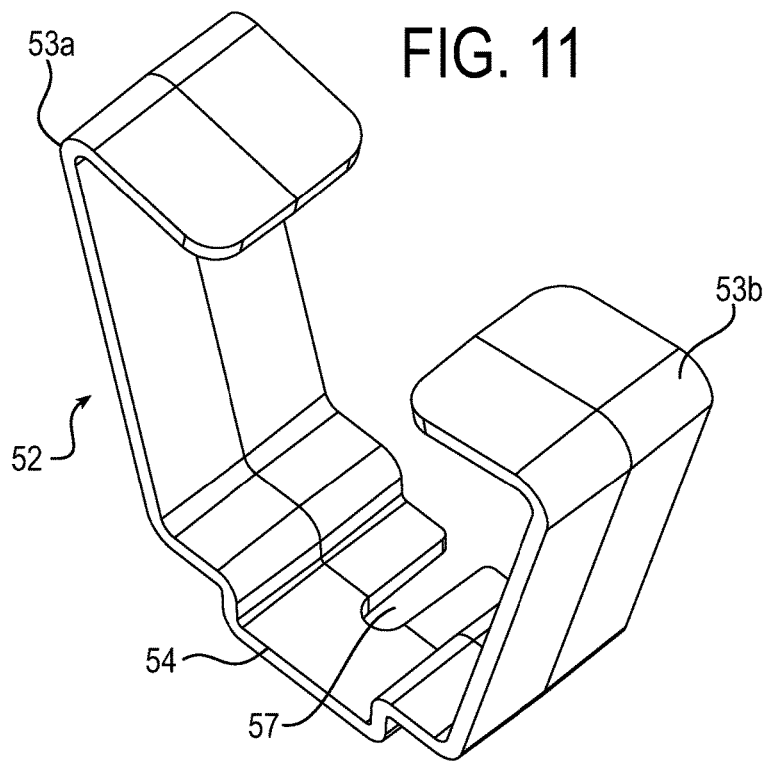
FIG. 11 is a perspective view of a cable management clip.

Referring to FIGS. 1, 2 and 11, a cable management clip 52 is generally V-shape or U-shape to provide a positioning guide for slack cable 51 between the legs 53a, 53b of the cable management clip. The legs 53a, 53b extend upwardly from the base 54 of the cable management clip, e.g., upward being relative to the illustrations. As is seen in FIG. 1, the slack cable 51 may be wrapped one or more times in a curved pattern, e.g., in a circle, oval, and so on, within the storage space 50 in the interior 11 of the media enclosure 10, guided and somewhat retained or restricted in movement by respective legs 53a, 53b of several cable management clips 52.

The cable management clip(s) 52 may be positioned for cooperation with a side wall 26a-26d to guide positioning of fiber optic cable 55 in the media enclosure. For example, as is illustrated in FIGS. 1 and 2, one leg 53a of a cable management clip 52 is adjacent a side wall 26d, and a fiber optic cable 55 is in the space 56 between the leg 53a and side wall 26d. One or both legs 53a, 53b of the cable management clips may be resilient; for example, the leg 53a may be resiliently bendable relative to the base 54 of the cable management clip and the cable management clip may be mounted to locate the leg 53a adjacent, or possibly touching, the wall 26d. The leg 53a may be bent away from the wall 26d to provide a gap to slip or to position or place a fiber optic cable into the space 56 and the leg may spring back into engagement with the wall or closer to the wall for cooperation with the wall to guide and maintain positioning of fiber optic cable 55 in the media enclosure. The leg 53a may be resiliently bent away from the wall 26d to permit easy removing of the fiber optic cable 55 from the space 56.

As is shown, the one leg 53a extends angularly from the rear or bottom wall 27 of the media enclosure. The juncture of the leg 53a with the base 54 of the cable management clip 52 is spaced from the side wall 26d, for example. The leg 53a extends angularly upward from the rear wall 27 toward an edge of the side wall 26d remote from the rear wall to provide the space 56 bounded generally between at least part of the leg 53a and part of the side wall 26d for guiding a fiber optic cable 55 in the space 56. A slot, hole or the like 57 in the base 54 may cooperate with a fastener 58, such as a screw or other fastener, to attach the clip 52 in the enclosure 10, e.g., as is shown in FIG. 2.

Figure 12:
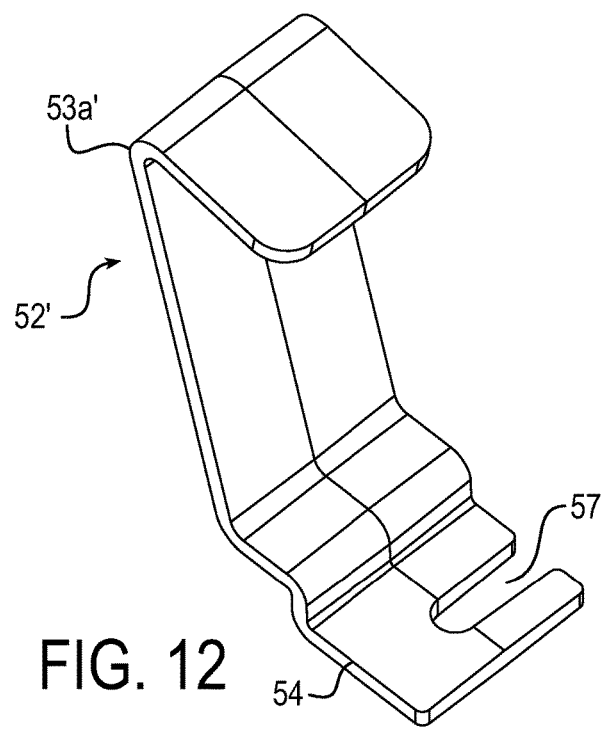
FIG. 12 is a perspective view of a one-legged cable management clip.

Briefly referring to FIG. 12, another cable management clip 52' is shown. Such cable management clip 52' is a one-legged clip having one leg 53a' that extends up from the base 54. The cable management clips 52, 52' may be substantially the same except the cable management clip 52' has only one leg 53a'. The leg 53a' may cooperate with a side wall 26a-26d of the media enclosure 10 to provide the functions of the leg 53a and side wall 26d described just above, e.g., to guide, position, provide space for, and so on for a fiber optic cable 55.

In FIG. 13 a media enclosure or fiber splice enclosure 10 is illustrated, as was mentioned and described above. It will be appreciated that the form of media enclosure shown is exemplary and that features of the splice tray 12 and other parts and functions described above may be used in connection with this and other forms of media enclosures, other types of enclosures or even generally in the open, i.e., not in an enclosure but used in conjunction with a wall or wall portion with which a splice retainer 13 and mounting bracket 14 are used to hold a splice connection 22 and/or conductors 23, 24. As can be seen, the media enclosure 10 of FIG. 13 is similar but different from the media enclosure (splice tray) of FIGS. 1 and 2; and this exemplifies that the splice tray 12 that is shown in FIGS. 1-3, for example, may be used in various media enclosures (splice trays) as is mentioned elsewhere herein.

Figure 14:
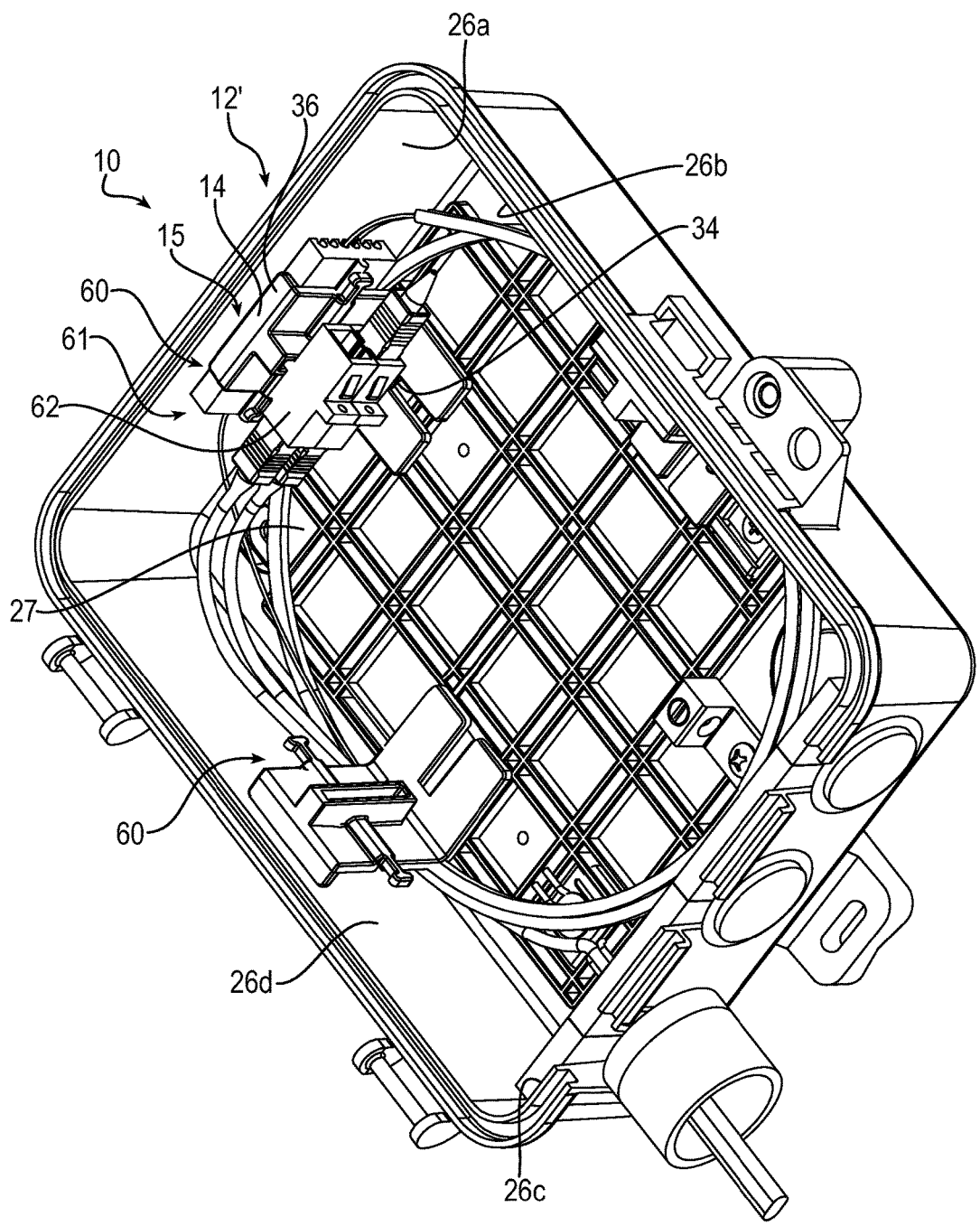
FIG. 14 is a perspective illustration of an embodiment of fiber splice enclosure including another embodiment of splice tray and cable management.

Referring to FIG. 14, another embodiment of splice tray 12' is illustrated in a media enclosure 10. The splice tray 12' includes a mounting bracket 14 that is similar or the same as the mounting bracket 14 described above and also includes a wall portion 15 of the media enclosure 10. The mounting bracket 14 may be positioned in the media enclosure 10, e.g., secured to the bottom wall 27 by a fastener 34 such that the top ledge 36 engages or is relatively close to the wall portion 15, e.g., portion of one of the side walls 26a-26d. The splice tray 12' does not include a splice retainer 13 of the type illustrated in FIGS. 1 and 2 and other figures and described above. Rather, the mounting bracket 14 and wall portion 15 provide a space 60 where a splice connection 22 and/or conductors 23, 24 may be provided in somewhat protected location in the media enclosure, i.e., protected from other components in the media enclosure. If desired, the mounting bracket 14 and wall portion 15 in the media enclosure 10 shown in FIG. 14 may cooperate to position and guide fiber optic cables and/or other parts in the media enclosure, e.g., as is shown in FIG. 14.

As is shown in FIG. 3, in the several embodiments illustrated and described, the mounting bracket includes a connector mount 61 for mounting one or more connectors 62. The connectors 62 may be interface connectors to connect between two terminated fiber optic cables, e.g., fiber optic cable with a cable termination attached thereto.

FIGS. 1-3 illustrate interface connectors 62 to which respective cable termination assemblies 63 are attached. The interface connectors 62 provide attachment to cable terminations 64 of cable termination assemblies 64 and provide an optical path for optical signals from respective fiber optic cables 65 to be transmitted between cable termination assemblies.

The connector mount 61 includes an elongate trough 66 that extends out from the back face 41 of the mounting bracket backing wall 33. The trough provides a space into which a flange 67 of one or more interface connectors 62 may be inserted and retained by frictional or other mechanical attachment.

In using a splice tray 12 with respective splice connections 22 a method is provided. The method is for positioning a fiber splice connection 22 with respect to a splice tray 12, which includes a resilient mounting bracket 14 that has a resilient characteristic, a splice retainer 13 that is coupled to the mounting bracket, and a wall 15 with respect to which the splice retainer is positioned by the mounting bracket. The method includes the steps of temporarily bending the mounting bracket to move the splice retainer away from the wall to provide access to a retainer space in the splice retainer, and positioning a splice connection to install it in the retainer space, e.g., by pressing the splice connection 22 into the opening 20 of the splice retainer, or to remove it from the retainer space. The wall may be part of a fiber splice enclosure 10. The positioning a splice connection may include positioning a splice connection in or removing a splice connection from the fiber splice enclosure. As mentioned above, the fiber splice enclosure may be a media enclosure.

The preferred embodiments of the present disclosure are described above with reference to the drawings. Many features and advantages of those embodiments are apparent from the detailed Specification, thus the accompanied claims intend to cover all such features and advantages of those embodiments which fall within the spirit, scope, and connotation thereof. The embodiments of the present disclosure are not limited to the exact structures and operations as illustrated and described, and they cover all suitable modifications and equivalents falling within the scope of the claims.

The invention claimed is:

1. A splice tray, comprising
A splice retainer including a main body having a pair of opposite sides, and at least one retainer space in one of the sides, the retainer space having an open extent along at least a portion at a surface of the one side to receive a splice connection of at least two conductors, and
A mounting bracket configured to hold the splice retainer relative to a wall with the open extent facing the wall for cooperation with the wall to retain a splice connection in the retainer space.

2. The splice tray of claim 1, wherein the retainer space comprises an elongate channel.

3. The splice tray of claim 2, wherein the elongate channel is of a cross sectional size and configuration to receive therein a fusion splice of optical fiber conductors, and wherein the elongate channel has a depth to substantially fully submerge the fusion splice beneath the surface of the one side.

4. The splice tray of claim 2, the elongate channel having retaining edges along at least part of the length thereof adjacent the surface of the one side providing a narrow gap to receive a fusion splice in the elongate channel while resisting removal of the fusion splice from the channel.

5. The splice tray of claim 2, wherein the splice retainer includes a plurality of additional elongate channels aligned parallel to and of the same configuration as said first-mentioned elongate channel.

6. The splice tray of claim 1, wherein the one side of the splice retainer is of a shape substantially conforming to the shape of the faced wall with which the splice retainer is cooperative to provide a protected area in which a splice connection may be retained.

7. The splice tray of claim 1, wherein the splice retainer is of resilient flexible material.

8. The splice tray of claim 1, wherein at least part of the mounting bracket is resiliently bendable for bending away from the wall to provide spacing of at least part of the splice retainer from the wall to permit access to at least one retainer space for placement, removal, or inspection of a splice connection.

9. The splice tray of claim 1, wherein the mounting bracket includes a support portion configured to face and engage the other of the sides of the splice retainer.

10. The splice tray of claim 9, further comprising a connector configured to hold the splice retainer and the mounting bracket together.

11. The splice tray of claim 10, wherein the connector comprises a protruding portion of the splice retainer and a receiving opening in the mounting bracket configured to receive and to hold the protruding portion, whereby the splice retainer and mounting bracket are held together, wherein the protruding portion comprises a raised ridge on the other side of the splice retainer extending in a linear direction generally parallel to the direction of the first mentioned retainer space, and the receiving opening extends in a linear direction to receive the raised ridge, and wherein the raised ridge has a curved cross section, is resiliently deformable and is configured to be compressed in the receiving opening for retention in the receiving opening.

12. A media enclosure, comprising
An interior having a rear wall and a plurality of side walls; and
The splice tray of claim 1, wherein the mounting bracket holds the splice retainer relative to at least one wall of the media enclosure to retain a splice connection in the retainer space.

13. The media enclosure of claim 12, further comprising a fastening mechanism configured to attach the mounting bracket to the media enclosure in position to hold the splice retainer facing at least one wall of the media enclosure, whereby such one wall covers at least part of the splice retainer to retain a splice connection in the retainer space.

14. The media enclosure of claim 13, wherein there are a number of splice trays distributed at respective locations in the media enclosure.

15. The media enclosure of claim 12, wherein the media enclosure includes a storage space for slack cable, and at least one cable management clip is mounted in the media enclosure to guide slack cable in stored position in the storage space.

16. The media enclosure of claim 15, wherein the cable management clip is generally V-shape to provide a positioning guide for slack cable between legs of the cable management clip.

17. The media enclosure of claim 12, further including a cable management clip mounted to the media enclosure, the cable management clip having a leg cooperative with a wall of the media enclosure to guide positioning of fiber optic cable in the media enclosure between the one leg and a side wall of the media enclosure.

18. A media enclosure, comprising
An interior having a rear wall and a plurality of side walls; and
A mounting bracket attached with respect to at least one of the rear wall or a side wall,
The mounting bracket having a surface facing a corresponding portion of the side wall defining a space between the surface and corresponding portion of the side wall,
The bottom end of the space bounded by the rear wall of the media enclosure, The mounting bracket having a top edge portion angularly arranged with respect to the surface covering one end of the space, wherein the mounting bracket is configured to hold a splice retainer in the space, Whereby the space is substantially bounded by the surface, corresponding portion of the side wall, top edge portion, and rear wall of the media enclosure, Wherein the space is open at respective sides of the space allowing a fiber optic cable to enter and/or to exit the space, Whereby the mounting bracket holds the fiber optic cable, via a retainer space of the splice retainer, with respect to the side wall of the media enclosure.

19. A method of positioning a fiber splice connection with respect to a splice tray that includes a resilient mounting bracket and a splice retainer that is coupled to the mounting bracket that has a resilient characteristic and a wall with respect to which the splice retainer is positioned by the mounting bracket, comprising temporarily bending the mounting bracket to move the splice retainer away from the wall to provide access to a retainer space in the splice retainer, and positioning a splice connection to install it in the retainer space or to remove it from the retainer space.

20. The method of claim 19, wherein the wall is part of a fiber splice enclosure, and said positioning a splice connection comprises positioning a splice connection in or removing a splice connection from the fiber splice enclosure.

\* \* \* \* \*